United States Patent
Nichols et al.

(10) Patent No.: US 10,553,247 B2
(45) Date of Patent: Feb. 4, 2020

(54) DATA STORAGE DEVICE CALIBRATING DATA DENSITY BASED ON AMPLITUDE-INVERTED OR TIME-INVERTED READ SIGNAL

(71) Applicant: Western Digital Technologies, Inc., San Jose, CA (US)

(72) Inventors: Mark A. Nichols, San Jose, CA (US); Robert E. Eaton, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 15/993,209

(22) Filed: May 30, 2018

(65) Prior Publication Data

US 2019/0371362 A1 Dec. 5, 2019

(51) Int. Cl.
*G11B 20/18* (2006.01)
*G11B 5/09* (2006.01)

(52) U.S. Cl.
CPC .............. *G11B 20/182* (2013.01); *G11B 5/09* (2013.01)

(58) Field of Classification Search
CPC ................................ G11B 20/182; G11B 5/09
See application file for complete search history.

(56) References Cited

U.S. PATENT DOCUMENTS

| | | | |
|---|---|---|---|
| 5,262,904 A | 11/1993 | Tang et al. | |
| 5,872,664 A | 2/1999 | Meier | |
| 6,208,477 B1 | 3/2001 | Cloke et al. | |
| 6,788,481 B2 | 9/2004 | Fang et al. | |
| 7,170,704 B2 | 1/2007 | DeGroat et al. | |
| 7,589,924 B2 | 9/2009 | Yoshizawa | |
| 7,974,030 B2 | 7/2011 | Mathew et al. | |
| 8,149,529 B2 | 4/2012 | Mathew et al. | |
| 8,279,551 B2 * | 10/2012 | Higa | G11B 5/59627 360/77.04 |
| 2003/0058699 A1 * | 3/2003 | Hirabayashi | G11B 7/005 365/200 |
| 2005/0249106 A1 * | 11/2005 | Coker | G11B 5/59633 369/275.1 |

(Continued)

OTHER PUBLICATIONS

C. M. Melas et al., "Nonlinear Superposition in Saturation Recording of Disk Media," IEEE Transactions on Magnetics, vol. MAG-23, No. 5, pp. 2079-2081 (1987).

(Continued)

*Primary Examiner* — Thien Nguyen

(57) ABSTRACT

A data storage device is disclosed comprising a head actuated over a disk. A test pattern is read from a first part of the disk to generate a first read signal that is sampled to generate a first sequence of signal samples. The test pattern is read from a second part of the disk to generate a second read signal that is sampled to generate a second sequence of signal samples. A third sequence of signal samples is generated by at least one of amplitude-inverting the second sequence of signal samples, time-inverting the second sequence of signal samples, and amplitude-inverting and time-inverting the second sequence of signal samples. A quality metric is generated based on the first sequence of signal samples and the third sequence of signal samples, and a data density of the disk is configured based on the quality metric.

24 Claims, 4 Drawing Sheets

(56) References Cited

U.S. PATENT DOCUMENTS

| | | | | |
|---|---|---|---|---|
| 2005/0254160 A1* | 11/2005 | Bandic | ............... | G11B 5/5526 |
| | | | | 360/77.08 |
| 2009/0290465 A1* | 11/2009 | Park | .................. | G11B 7/08511 |
| | | | | 369/53.23 |
| 2011/0149434 A1* | 6/2011 | Coker | ............... | G11B 5/59655 |
| | | | | 360/77.08 |

OTHER PUBLICATIONS

D. Palmer, P. Ziperovich, & R. Wood, "Identification of Nonlinear Write Effects Using Pseudorandom Sequences," IEEE Trans. Mag., vol. 23, pp. 2377-2379, (1987).

Y. Lin & R. Wood, "An estimation technique for accurately modelling the magnetic recording channel including nonlinearities," IEEE Trans. Mag, vol. 25, No. 5, pp. 4084-4086 (1989).

T. Howell, G. Main, "Determining a signal to noise ratio for an arbitrary data sequence by a time domain analysis," IEEE Trans. Mag., vol. 29, No. 6. pp. 3999-4001 (1993).

Xiaodong Che, "Nonlinearity Measurements and Write Precompensation Studies for a PRML Recording channel," IEEE Trans. Mag., vol. 31, No. 6, pp. 3021-3026, (1995).

Alexander Taratorin, "Characterization of Magnetic Recording Systems: A Practical Approach," Guzik Technical Enterprises http://www.guzik.com/product/introduction-to-prml (1996).

Tecktronix, "Measurement Solutions for Disk Drive Design," Tektronix Application Note, https://www.tek.com/document/application-note/measurement-solutions-disk-drive-design (2002).

M. Nichols & N. Miladinovic, "A new kind of non-linear distortion in hard disk drives," Journal of Applied Physics 111, 07B731 (2012).

\* cited by examiner

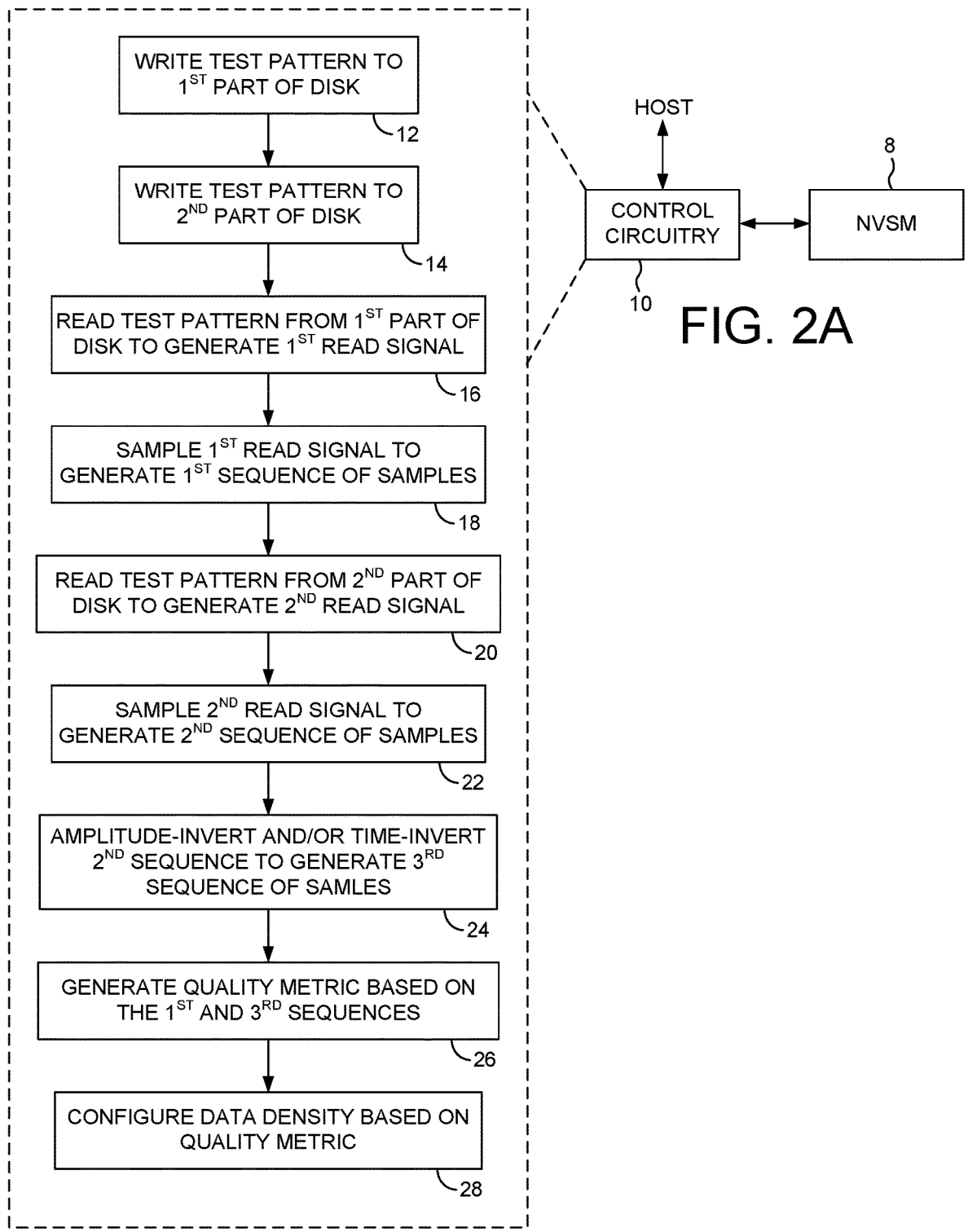

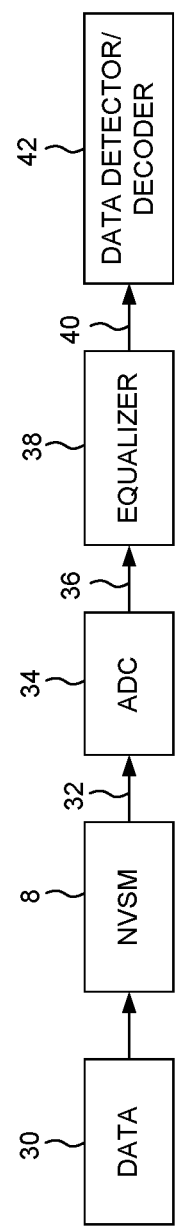
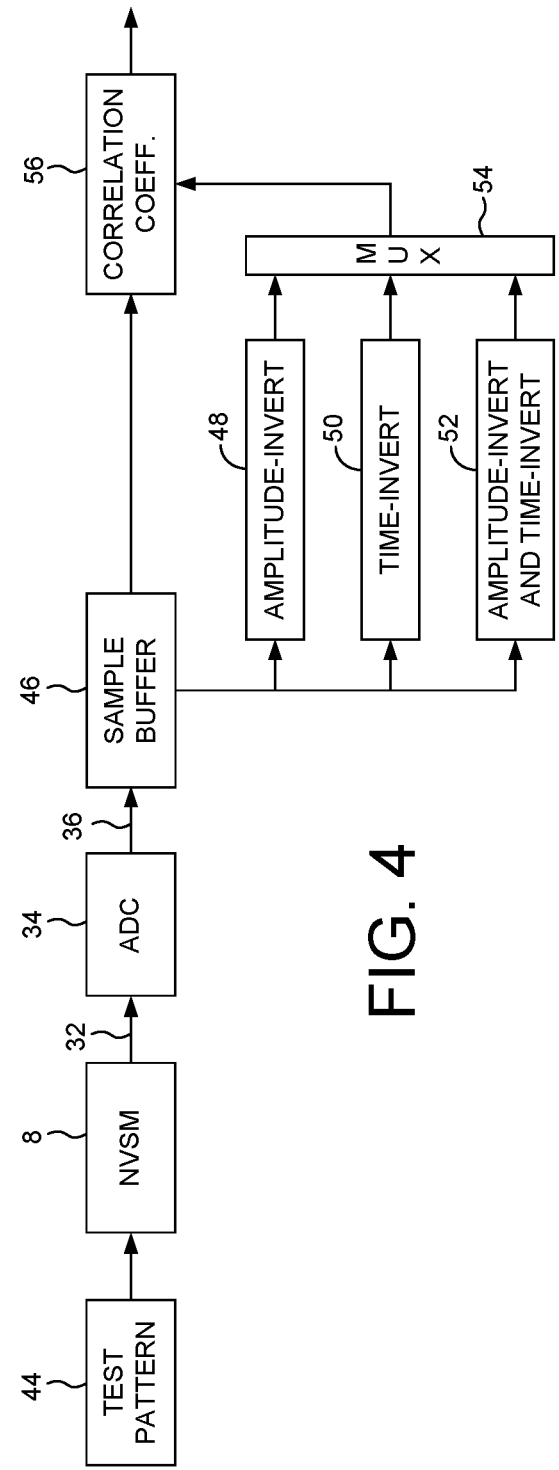
FIG. 3 (Prior Art)
FIG. 4

DATA STORAGE DEVICE CALIBRATING DATA DENSITY BASED ON AMPLITUDE-INVERTED OR TIME-INVERTED READ SIGNAL

BACKGROUND

Data storage devices such as disk drives, tape drives, and solid state drives employ a storage medium (magnetic, optical, semiconductor, etc.) together with suitable write/read control circuitry for accessing the storage medium. FIG. 1A shows a prior art disk format 2 as comprising a number of servo tracks 4 defined by servo sectors $6_0$-$6_N$ recorded around the circumference of each servo track. Data tracks are defined relative to the servo tracks at the same or different radial density, wherein each data track comprises a plurality of data sectors. The storage capacity of the disk depends on the radial density of the data tracks as well as the linear bit density of the data recorded in the data sectors. FIG. 1B shows a prior art die format for a solid state drive, wherein each die may store multiple pages and each page may store multiple blocks each corresponding to a data sector of a disk drive.

BRIEF DESCRIPTION OF THE DRAWINGS

FIG. 2A shows a data storage device according to an embodiment comprising a non-volatile storage medium (NVSM).

FIG. 2B is a flow diagram according to an embodiment wherein a data density of a disk is configured based on an amplitude-inverted and/or time-inverted sequence of signal samples generated by reading a test pattern from the disk.

FIG. 3 shows prior art control circuitry for writing/reading data to/from the NVSM, including an equalizer for equalizing the signal samples.

FIG. 4 shows control circuitry according to an embodiment wherein a correlation coefficient may be computed for the signal samples and the amplitude-inverted and/or time-inverted signal samples.

DETAILED DESCRIPTION

Figure 1A:
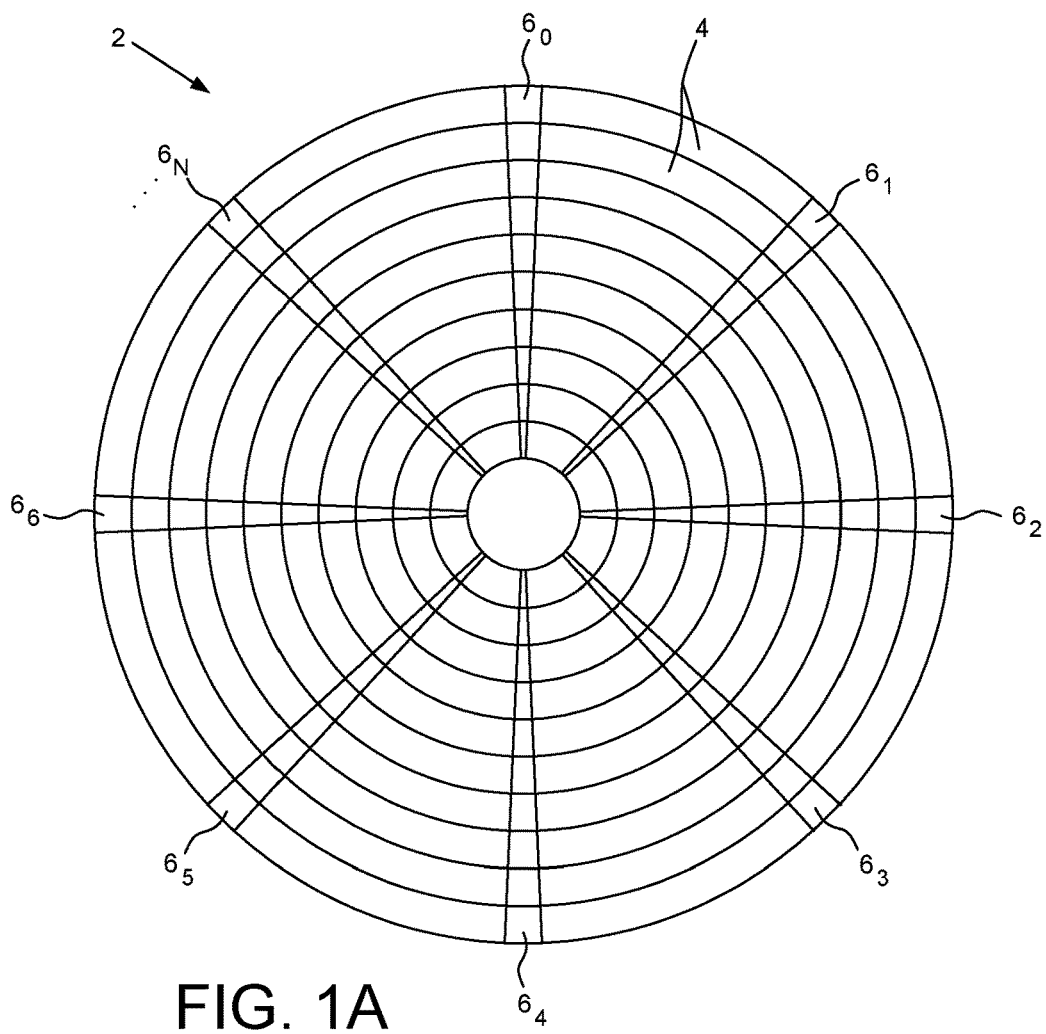
FIG. 1A shows a prior art disk format comprising a plurality of servo tracks defined by servo sectors.
Figure 1B:
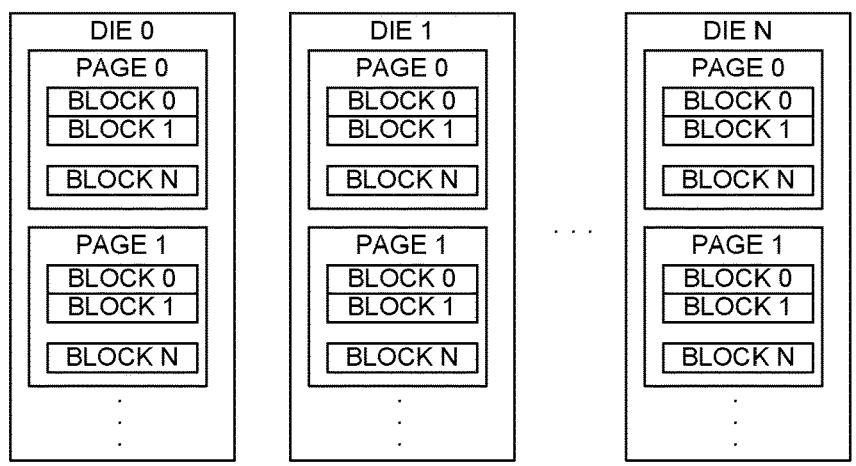
FIG. 1B shows a prior art die format for a solid state drive, wherein each die may store multiple pages and each page may store multiple blocks each corresponding to a data sector of a disk drive.

FIG. 2A shows a data storage device according to an embodiment comprising a non-volatile storage medium (NVSM) 8, and control circuitry 10 configured to execute the flow diagram of FIG. 2B. The data storage device may include one or more types of NVSM, including rotating magnetic media (e.g., a hard disk drive), magnetic tape media (e.g., tape drive), and solid state memory (e.g., a solid state drive). While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory, TLC, QLC, etc., or any combination thereof), NOR memory, EEPROM, Ferroelectric Memory (FeRAM), Magneto-resistive RAM (MRAM), other discrete NVM chips, or any combination thereof.

Referring to the flow diagram of FIG. 2B, a test pattern is written to a first part of a disk (block 12), and the test pattern is written to a second part of the disk (block 14). The test pattern is read from the first part of the disk to generate a first read signal (block 16), and the first read signal is sampled to generate a first sequence of signal samples (block 18). The test pattern is read from the second part of the disk to generate a second read signal (block 20), and the second read signal is sampled to generate a second sequence of signal samples (block 22). A third sequence of signal samples is generated (block 24) by at least one of amplitude-inverting the second sequence of signal samples, time-inverting the second sequence of signal samples, and/or amplitude-inverting and time-inverting the second sequence of signal samples. A quality metric is generated based on the first sequence of signal samples and the third sequence of signal samples (block 26), and a data density of the disk is configured based on the quality metric (block 28).

FIG. 3 shows prior art control circuitry for writing/reading data to/from the NVSM 8, wherein the write data 30 modulates a recording process, such as modulating a write current in a write coil when writing magnetic transitions to a magnetic disk medium, or modulating a voltage when writing data to a non-volatile semiconductor memory (e.g., Flash memory). During a read operation, a read signal 32 is generated when reading the NVSM 8, such as by sensing magnetic transitions recorded on a disk using a suitable read element (e.g., magnetoresistive element) or by sensing voltage levels when reading a non-volatile semiconductor memory. The read signal 32 may be sampled by an analog-to-digital converter (ADC) 34 to generate signal samples 36 that may be equalized into a suitable response by an equalizer filter 38. The equalized signal samples 40 may be processed by a suitable detector/decoder 42 such as a Viterbi-type detector and/or a low density parity check (LDPC) type decoder in order to detect the data stored on the NVSM 8.

Prior art data storage devices typically calibrate various operating parameters of the device, such as the data density of a magnetic disk medium which may include a radial density of the data tracks and/or a linear bit density of the data sectors. The write/read channel circuitry of the data storage device may also be calibrated, such as calibrating a write current amplitude, a fly height of a head over a disk, a laser or microwave power for energy assisted magnetic recording, coefficients of the equalizer 38, parameters of the detector/decoder 42, etc. Calibrating the various operating parameters of the device typically involves writing/reading a test pattern to/from the NVSM 8 in order to generate a quality metric of the resulting read signal. The calibration parameters may be adjusted (and optionally adapted over time) so as to maximize the quality of the read signal, thereby optimizing performance, such as optimizing data capacity, data transfer rate, data recover accuracy, power consumption, etc.

A known quality metric conventionally used to calibrate a data storage device is referred to as an autocorrelation signal-to-noise ratio (AC-SNR) generated by writing a test pattern to different parts of the NVSM, and computing a correlation coefficient for the resulting read signals when reading the test pattern from the NVSM. When the quality of the read signal is high, it means the signal noise is low and the measured AC-SNR is therefore high. An example of generating an AC-SNR quality metric is described by T. Howell and G. Main in an article published in IEEE Transactions on Magnetics entitled "Determining a signal to noise ratio for an arbitrary data sequence by a time domain analysis," the disclosure of which is incorporated herein by reference. The above article generates the AC-SNR by computing a Pearson correlation coefficient defined as:

$$r(X, Y) = \frac{cov(X, Y)}{\sigma_X \sigma_Y}$$

where X represents the signal samples of the read signal generated by reading the test pattern from a first part of the NVSM, Y represents the signal samples of the read signal generated by reading the test pattern from the second part of the NVSM, cov is the covariance of X and Y, $\sigma_X$ is the standard deviation of X, and $\sigma_Y$ is the standard deviation of Y. The AC-SNR is defined in decibels as:

$$AC\_SNR = 10\log_{10} \frac{r(X, Y)}{1 - r(X, Y)}$$

Although calibrating a data storage device using an AC-SNR quality metric can be useful, the inventors have discovered other quality metrics which can provide even better optimization when used in addition to, or instead of, a conventional AC-SNR quality metric. In one embodiment, an autocorrelation signal to asymmetry ratio (AC-SAR) quality metric may be generated by amplitude-inverting the signal samples of one of the read signals (X or Y) when computing the correlation coefficient as described above. In one embodiment, the AC-SAR quality metric provides a measure of asymmetry in the read signal. In another embodiment, an autocorrelation signal to distortion ratio (AC-SDR) quality metric may be generated by time-inverting the signal samples of one of the read signals (X or Y) when computing the correlation coefficient as described above. In one embodiment, the AC-SDR quality metric provides a measure of distortion in the read signal. In yet another embodiment, an autocorrelation signal to non-linear distortion ratio (AC-SNLDR) quality metric may be generated by amplitude-inverting and time-inverting the signal samples of one of the read signals (X or Y) when computing the correlation coefficient as described above. In one embodiment, the AC-SNLDR quality metric provides a measure of non-linear distortion in the read signal. In one embodiment, one or more of the above described quality metrics (AC-SAR, AC-SDR and/or AC-SNLDR) may be used in addition to (or instead of) the conventional AC-SNR quality metric in order to calibrate any suitable parameter of the data storage device. That is, in one embodiment a parameter of the data storage device may be calibrated so as to maximize one or more of the above described quality metrics to better optimize performance as compared to calibrating the data storage device based only on the conventional AC-SNR quality metric.

FIG. 4 shows control circuitry according to an embodiment for generating the above described quality metrics. A suitable test pattern 44 is written to a first and second part of the NVSM 8, such as a first and second part of a data track. The test pattern is then read from the first part of the NVSM 8 to generate a read signal 32 that is sampled to generate a first sequence of signal samples 36 stored in a samples buffer 46. The test pattern is also read from the second part of the NVSM 8 to generate a read signal 32 that is sampled to generate a second sequence of signal samples 36 stored in the samples buffer 46. A third sequence of signal samples is generated by at least one of amplitude-inverting the second sequence of signal samples at block 48, time-inverting the second sequence of signal samples at block 50, and/or amplitude-inverting and time-inverting the second sequence of signal samples at block 52. At block 56 a correlation coefficient is computed as described above for the first sequence of signal samples and the third sequence of signal samples as selected by a multiplexer 54. In one embodiment, the resulting correlation coefficient may be further processed to generate one or more of the above described quality metrics (AC-SAR, AC-SDR, and/or AC-SNLDR), such as with the above equation used to generate the conventional AC-SNR quality metric.

Figure 5A:
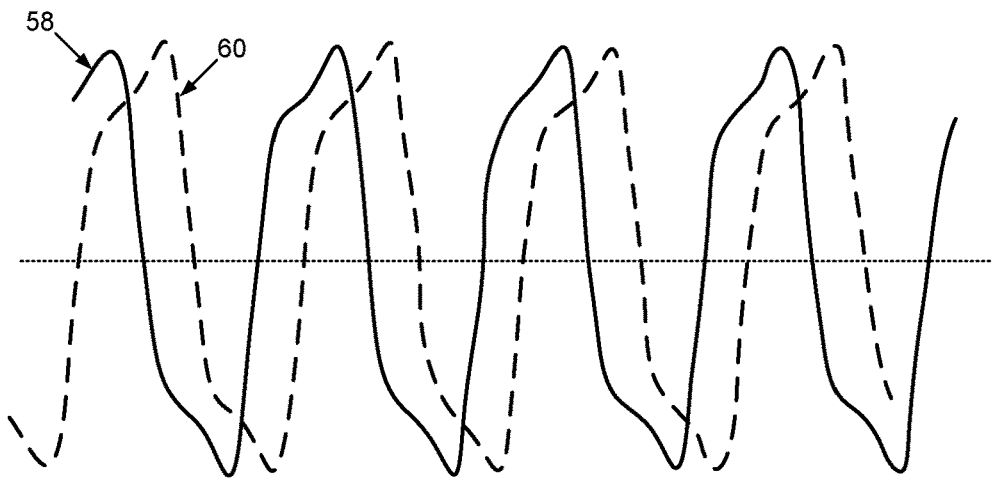
FIG. 5A shows an example read signal and amplitude-inverted read signal when reading a test pattern from different parts of the NVSM.
Figure 5B:
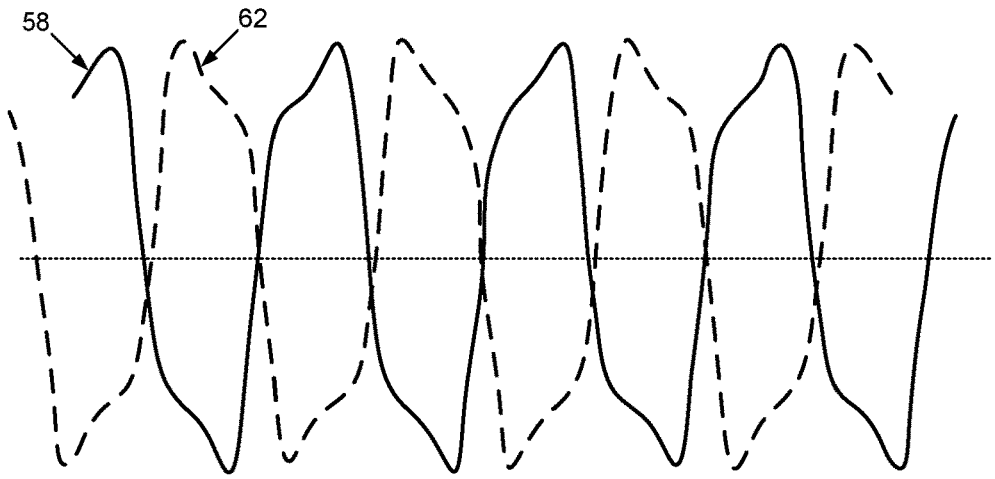
FIG. 5B shows an example read signal and time-inverted read signal when reading a test pattern from different parts of the NVSM.
Figure 5C:
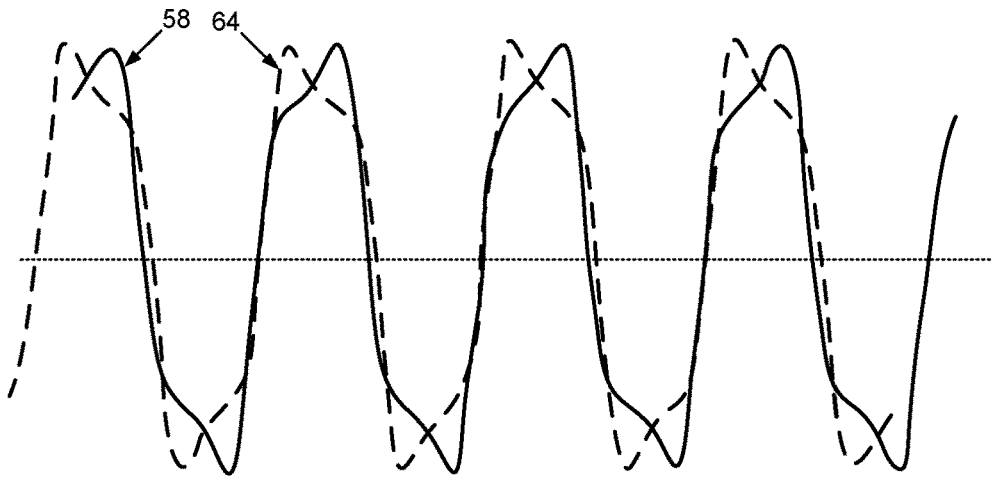
FIG. 5C shows an example read signal and amplitude-inverted and time-inverted read signal when reading a test pattern from different parts of the NVSM.

FIG. 5A shows an example read signal 58 generated from reading the test pattern from the first part of the NVSM, and an amplitude-inverted read signal 60 generated from reading the test pattern from the second part of the NVSM (where a phase offset has been added to the second read signal for clarity). FIG. 5B shows an example read signal 58 generated from reading the test pattern from the first part of the NVSM, and a time-inverted read signal 62 generated from reading the test pattern from the second part of the NVSM. FIG. 5C shows an example read signal 58 generated from reading the test pattern from the first part of the NVSM, and an amplitude-inverted and time-inverted read signal 64 generated from reading the test pattern from the second part of the NVSM. The examples of FIGS. 5A, 5B and 5C show the read signal waveforms as continuous time signals; however, in one embodiment the read signal is sampled as described above and the signal samples of the read signal are amplitude-inverted and/or time-inverted.

Any suitable test pattern may be employed to generate the above described quality metrics, such as a periodic bit sequence (constant tone), or a pseudo-random-bit sequence (PRBS) to evaluate multiple contexts and wavelengths. In one embodiment, the length of the test pattern comprises a sufficient number of bits so as to minimize the longitudinal correlation effect of the channel on the noise (the above AC-SNR equation assumes additive white Gaussian noise). In the embodiment where the signal samples are time-inverted (e.g., when generating the AC-SDR or AC-SNLDR quality metric), the test pattern may consist of a suitable palindrome sequence so that inverting the sequence results in the same sequence before inversion. In one embodiment, a palindrome sequence may be generated by concatenating a PRBS with a time-inverted version of the same PRBS, thereby generating a mirrored sequence that is the same when viewed from either direction.

The quality metric generated based on an amplitude-inverted and/or time-inverted read signal may be used for any suitable reason other than, or in addition to, calibrating the data density of a disk storage medium. In one embodiment, the parameters of a write/read channel such as shown in FIG. 3 may be calibrated together with calibrating the data density of a disk storage medium since they may be interdependent. In yet another embodiment, the parameters of the data storage device may be adapted over time based on the above quality metrics, for example, when there is a degradation in operating performance such as a decrease in the data recovery rate.

In the embodiment shown in FIG. 4, the above quality metric(s) are generated based on the signal samples output by the ADC 36 before being equalized by the equalizer filter 38. In another embodiment, the above quality metric(s) may be generated based on the equalized signal samples 40 which may help optimize the calibration of the equalizer filter 38. In addition, the signal samples may be conditioned using other suitable signal processing techniques, such as DC offset attenuation, asymmetry attenuation, noise predictive filtering, etc., wherein the above quality metric(s) may be generated before and/or after the signal processing of the signal samples.

A data storage device may be considered a type of communication channel with the NVSM 8 a type of transmission medium. Accordingly, the above described quality metrics may be employed in any suitable device having a communication channel, such as with radio transmission, cellar transmission, satellite transmission, optical transmission, etc. In one embodiment, the quality metric(s) may be used to calibrate the transmitter or receiver side of a communication channel, configure the data transmission rate, etc.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the NVSM and read into a volatile semiconductor memory when the data storage device is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head actuated over the disk; and
control circuitry configured to:
  write a test pattern to a first part of the disk;
  write the test pattern to a second part of the disk;
  read the test pattern from the first part of the disk to generate a first read signal;
  sample the first read signal to generate a first sequence of signal samples;
  read the test pattern from the second part of the disk to generate a second read signal;
  sample the second read signal to generate a second sequence of signal samples;
  generate a third sequence of signal samples by at least one of:
    (a) amplitude-inverting the second sequence of signal samples;
    (b) time-inverting the second sequence of signal samples; or
    (c) amplitude-inverting and time-inverting the second sequence of signal samples;
  generate a quality metric by computing a covariance of the first sequence of signal samples and the third sequence of signal samples; and
  configure a data density of the disk based on the quality metric.

2. The data storage device as recited in claim 1, wherein the control circuitry is further configured to generate the quality metric by computing a correlation coefficient for the first sequence of signal samples and the third sequence of signal samples.

3. The data storage device as recited in claim 1, wherein the control circuitry is further configured to configure the data density of the disk by configuring a data track density of the disk.

4. The data storage device as recited in claim 1, wherein the control circuitry is further configured to configure the data density of the disk by configuring a linear bit density of the disk.

5. The data storage device as recited in claim 1, wherein the test pattern consists of a palindrome sequence.

6. The data storage device as recited in claim 1, wherein amplitude-inverting the second sequence of signal samples generates the quality metric as representing an asymmetry in the first read signal.

7. The data storage device as recited in claim 1, wherein time-inverting the second sequence of signal samples generates the quality metric as representing a distortion in the first read signal.

8. The data storage device as recited in claim 1, wherein amplitude-inverting and time-inverting the second sequence of signal samples generates the quality metric as representing a non-linear distortion in the first read signal.

9. A method of operating a data storage device, the method comprising:
  using a read channel to read a test pattern from a first part of a non-volatile storage medium (NVSM) to generate a first read signal;
  sampling the first read signal to generate a first sequence of signal samples;
  using the read channel to read the test pattern from a second part of the NVSM to generate a second read signal;
  sampling the second read signal to generate a second sequence of signal samples;
  generating a third sequence of signal samples by at least one of:
    (a) amplitude-inverting the second sequence of signal samples;
    (b) time-inverting the second sequence of signal samples; or
    (c) amplitude-inverting and time-inverting the second sequence of signal samples;
  generating a quality metric by computing a covariance of the first sequence of signal samples and the third sequence of signal samples; and
  configuring a parameter of the read channel based on the quality metric.

10. The method as recited in claim 9, wherein the parameter of the read channel comprises a parameter of an equalizer filter.

11. The method as recited in claim 9, further comprising generating the quality metric by computing a correlation coefficient for the first sequence of signal samples and the third sequence of signal samples.

12. The method as recited in claim 9, wherein the test pattern consists of a palindrome sequence.

13. The method as recited in claim 9, wherein amplitude-inverting the second sequence of signal samples generates the quality metric as representing an asymmetry in the first read signal.

14. The method as recited in claim 9, wherein time-inverting the second sequence of signal samples generates the quality metric as representing a distortion in the first read signal.

15. The method as recited in claim 9, wherein amplitude-inverting and time-inverting the second sequence of signal samples generates the quality metric as representing a non-linear distortion in the first read signal.

16. Control circuitry configured to:
  receive a test pattern from a communication channel to generate a first receive signal;
  sample the first receive signal to generate a first sequence of signal samples;
  receive the test pattern from the communication channel to generate a second receive signal;
  sample the second receive signal to generate a second sequence of signal samples;
  generate a third sequence of signal samples by at least one of:
    (a) amplitude-inverting the second sequence of signal samples;
    (b) time-inverting the second sequence of signal samples; or
    (c) amplitude-inverting and time-inverting the second sequence of signal samples;
  generate a quality metric by computing a covariance of the first sequence of signal samples and the third sequence of signal samples; and
  configure a parameter of the communication channel based on the quality metric.

17. The control circuitry as recited in claim 16, wherein the communication channel comprises read channel circuitry of a data storage device.

18. The control circuitry as recited in claim 17, wherein the communication channel is configured to read the test pattern from a disk.

19. The control circuitry as recited in claim 16, wherein the parameter of the communication channel comprises a parameter of an equalizer filter.

20. The control circuitry as recited in claim 16, wherein the control circuitry is further configured to generate the quality metric by computing a correlation coefficient for the first sequence of signal samples and the third sequence of signal samples.

21. The control circuitry as recited in claim 16, wherein the test pattern consists of a palindrome sequence.

22. The control circuitry as recited in claim 16, wherein amplitude-inverting the second sequence of signal samples generates the quality metric as representing an asymmetry in the first receive signal.

23. The control circuitry as recited in claim 16, wherein time-inverting the second sequence of signal samples generates the quality metric as representing a distortion in the first receive signal.

24. The control circuitry as recited in claim 16, wherein amplitude-inverting and time-inverting the second sequence of signal samples generates the quality metric as representing a non-linear distortion in the first receive signal.

* * * * *